(12) United States Patent
Patoka

(10) Patent No.: US 7,658,153 B1
(45) Date of Patent: Feb. 9, 2010

(54) CHILD'S TRAVEL CENTER

(76) Inventor: Diana L. Patoka, 265 Wake Island Dr., Amherst, WI (US) 54406-9388

( * ) Notice: Subject to any disclaimer, the term of this patent is extended or adjusted under 35 U.S.C. 154(b) by 0 days.

(21) Appl. No.: 12/248,632

(22) Filed: Oct. 9, 2008

(51) Int. Cl.
*A47B 23/00* (2006.01)

(52) U.S. Cl. .............................. 108/44; 108/46; 108/47; 108/152

(58) Field of Classification Search ................... 108/44, 108/45, 47, 42, 152, 48; 297/423.15, 423.1, 297/423.39, 395
See application file for complete search history.

(56) References Cited

U.S. PATENT DOCUMENTS

| | | | | |
|---|---|---|---|---|
| 2,687,336 A * | 8/1954 | Smith et al. | ................... | 108/44 |
| 2,774,641 A * | 12/1956 | Borders, Jr. et al. | ........... | 108/44 |
| 2,921,824 A * | 1/1960 | Richter | ......................... | 108/44 |
| 2,932,544 A * | 4/1960 | Lambert | ...................... | 108/44 |
| 3,037,639 A * | 6/1962 | Kost | ............................ | 108/47 |
| 3,625,161 A * | 12/1971 | Rosner | ......................... | 108/44 |
| 3,784,990 A * | 1/1974 | Elisofon et al. | ................ | 108/44 |
| 4,726,621 A | 2/1988 | Muller | | |
| 4,770,107 A | 9/1988 | Miller | | |
| 4,830,243 A * | 5/1989 | Mann | .......................... | 108/44 |
| 5,046,433 A * | 9/1991 | Kramer et al. | ................. | 108/44 |
| 5,269,229 A | 12/1993 | Akapatangkul | | |
| D344,625 S | 3/1994 | Berry | | |
| 5,370,060 A * | 12/1994 | Wang | ........................... | 108/44 |
| 5,556,167 A | 9/1996 | Siemion | | |
| 5,558,026 A * | 9/1996 | Seibert | ......................... | 108/44 |
| 5,713,628 A | 2/1998 | Lucatuorto | | |
| 5,878,672 A * | 3/1999 | Ostermann et al. | ............ | 108/44 |
| 6,375,119 B2 | 4/2002 | Park et al. | | |
| 6,591,763 B2 | 7/2003 | Getfield | | |
| 6,659,545 B1 | 12/2003 | McMillan | | |
| 6,679,188 B1 * | 1/2004 | Spagnoli, Jr. | ................. | 108/44 |

* cited by examiner

*Primary Examiner*—José V Chen

(57) ABSTRACT

This patent discloses a table assembly to provide leg support for a person and to hold articles and food in an automobile. The table assembly may include a headrest fastener, a tray, a footrest, and a leveler bar, each attached to a table housing. The table housing and tray may be adjusted vertically and the tray and footrest may be adjusted horizontally. The leveler bar may be rotated to position the tray and footrest in a horizontal alignment.

12 Claims, 9 Drawing Sheets

CHILD'S TRAVEL CENTER

BACKGROUND

1. Field

The information disclosed in this patent relates to a table assembly. The table assembly may be attached to a back of an automobile passenger seat and may include a tray and a footrest to support needs of a child sitting in a child's car seat facing the table assembly.

2. Background Information

Automobile travel for children is difficult and made more difficult when the child is secured in a child restraint seat. The restrained child often becomes board due to a limited view of the outside. In addition, the child often becomes agitated due to the restraints and weight of the child's feet pulling on the child's legs. This may lead to a child kicking the vertical backing of a front passenger seat. In addition, car rides have a tendency to make children sleepy, and if they remain safely buckled in their seats, their dangling feet can keep them from fully relaxing. Blood circulation to the legs may be compromised and the child eventually may become quite fatigued and uncomfortable, leading to the squirming and fussing that parents dread in the enclosed environment of the moving vehicle. What is needed is an apparatus to address these and other issues.

SUMMARY

This patent discloses a table assembly to provide leg support for a person and to hold articles and food in an automobile. The table assembly may include a headrest fastener, a tray, a footrest, and a leveler bar, each attached to a table housing. The table housing and tray may be adjusted vertically and the tray and footrest may be adjusted horizontally. The leveler bar may be rotated to position the tray and footrest in a horizontal alignment.

DETAILED DESCRIPTION

Figure 1:
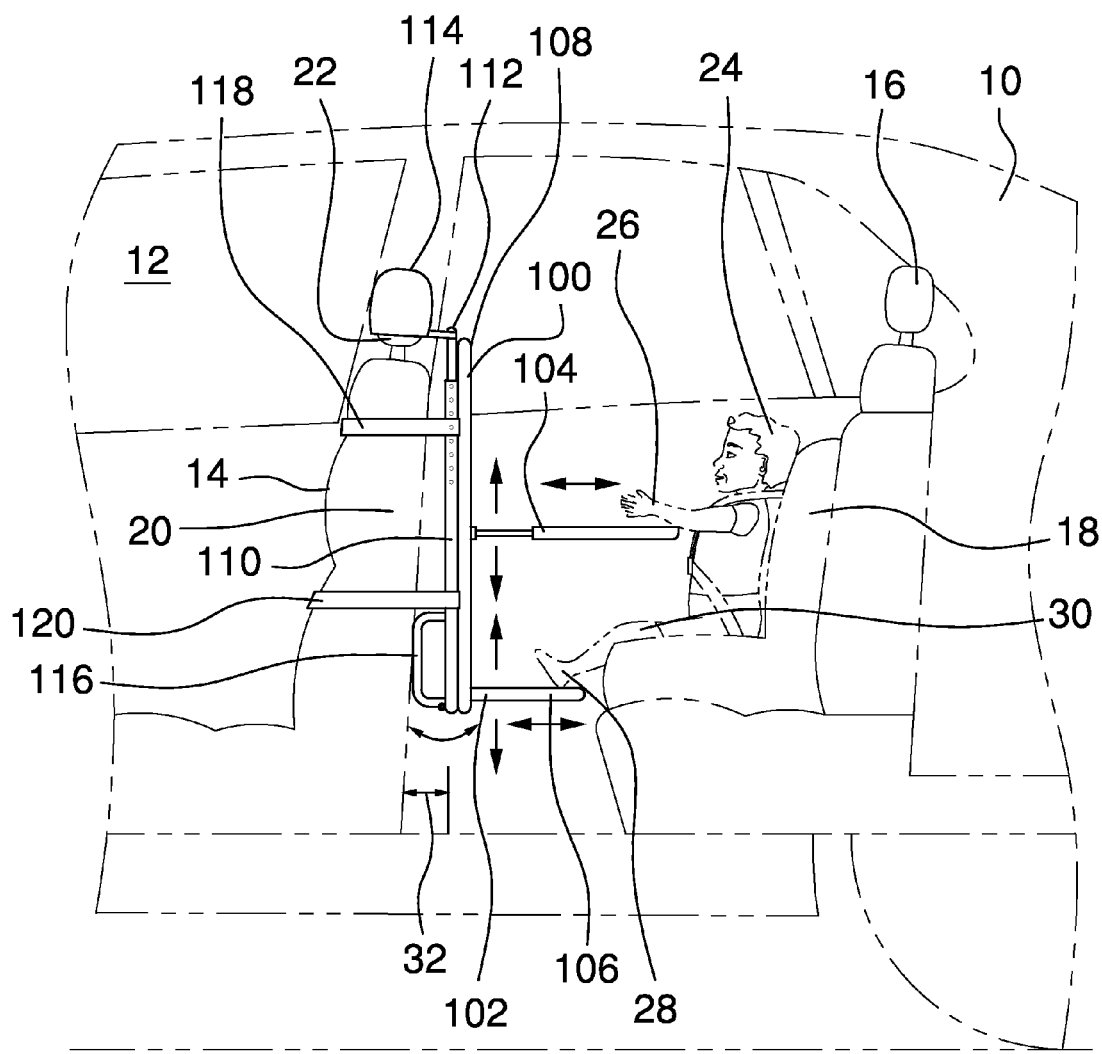
FIG. 1 is a side view of an automobile table assembly 100 in an automobile 10.

FIG. 1 is a side view of an automobile table assembly 100 in an automobile 10. Table assembly 100 may be a child's travel center having tables 102, such as a tray 104 and a footrest 106. Automobile 10 may include a cab compartment 12 having a front seat 14, a rear seat 16, and a child-restraint seat 18. Front seat 14 may have a front seat back 20 supporting a headrest 22. Table assembly 100 may be secured to front seat back 20 and front seat headrest 22 to face child-restraint seat 18. A child 24 secured within child-restraint seat 18 may rest an arm 26 on tray 102 and rest feet 28 on footrest 106 to support legs 30. Child 24 additionally may use tray 102 to support a drink cup, snacks, toys, books, and other items that may entertain child 24. Table assembly 100 may help to keep child 24 comfortable, happy, and occupied to allow a driver to concentrate on driving car 10 rather than the comforts of child 24.

Figure 2:
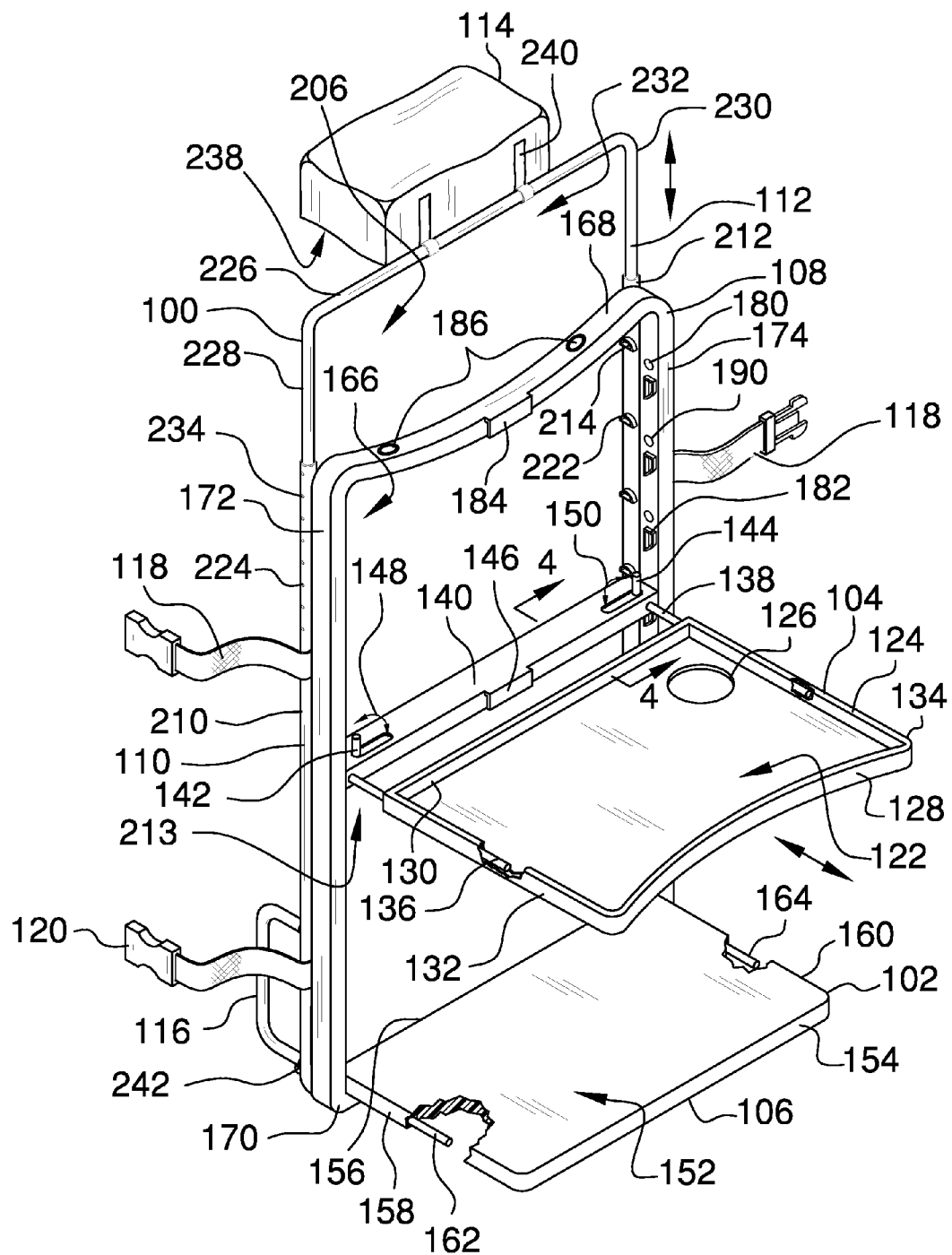
FIG. 2 is an isometric view of table assembly 100.

FIG. 2 is an isometric view of table assembly 100. As noted above, table assembly 100 may include tables 102, such as tray 104 and footrest 106. In addition, table assembly 100 may include a table housing 108, an adjusting frame 110, a support frame 112, a headrest fastener 114, a leveler bar 116, an upper buckle strap assembly 118, and a lower buckle strap assembly 120. Both tray 104 and footrest 106 may be attached to table housing 108. Table housing 108, leveler bar 116, upper buckle strap assembly 118, and lower buckle strap assembly 120 each may be attached to adjusting frame 110. Support frame 112 may be attached to headrest fastener 114 and adjusting frame 110 may be attached to support frame 112.

Headrest fastener 114 may be attached to front seat headrest 22 (FIG. 1) to secure support frame 112 vertically to automobile 10. Both tray 104 and footrest 106 may be rotated out of table housing 108 into a horizontal position. Adjusting frame 110 may be moved up and down relative to support frame 112 to raise and lower tables 102 vertically relative to support frame 112 and to child-restraint seat 18. The length of legs 30 of child 24 may vary from child to child and vary over time as the child grows. In this regard, adjusting frame 110 may be moved to locate footrest 106 in a position where child 24 may place feet 28 on footrest 106.

Under some circumstances, front seat back 20 may not be vertical. Leveler bar 116 may be rotated relative to adjusting frame 110 to pivot table assembly 100 relative to front seat back 20 and align tables 102 in a horizontal position. In one example, tables 102 may include a level tool having a floating bubble to help judge whether tables 102 are horizontal. Upper buckle strap assembly 118 and lower buckle strap assembly 120 may be secured around front seat back 20. Tray 104 may be moved up and downward relative to table housing 108 to be positioned at a comfortable height for arms 26 of child 24. In addition to being configured to rotate and move vertically, both tray 104 and footrest 108 may be move horizontally relative to table housing 108 to further refining the relative positioning of tables 102 to child 24.

Tray 104 may be an open receptacle to hold articles and food. Tray 104 may include a tray support surface 122 (FIG. 2) surrounded by a tray lip 124. Tray support surface 122 may be a flat plate that may include a cup holder 126 formed within an upper right corner of tray support surface 122. Tray lip 124 may be a top, raised edge of tray 104 extending upward and away from tray support surface 122. Cup holder 126 may be a device to hold a cup or other drinking container. In one example, cup holder 126 may be a recessed circular area formed within tray support surface 122. In one example, cup holder 126 may have a bottom. In another example, cup holder 126 may be a through hole.

Tray 104 may include a tray front 128 and a tray rear 130 positioned between a tray left side 132 and a tray right side 134. Tray front 128 may be concaved to curve inward into tray 104 and away from child 24. In addition, tray left side 132 and tray right side 134 may be hollow to receive a tray left bracket 136 and a tray right bracket 138, respectively.

Tray left bracket 136 and tray right bracket 138 each may be elongated rods. Tray left bracket 136 and tray right bracket 138 may fit within tray left side 132 and a tray right side 134, respectively, to support tray 104. Table assembly 100 additionally may include a tray support bar 140. Tray left bracket 136 and tray right bracket 138 may be attached to tray support bar 140 and allow tray 104 to horizontally slide relative to tray left bracket 136 and tray right bracket 138.

Tray support bar 140 may be configured to be rotatably secure within table housing 108. Tray support bar 140 may include a left adjusting lever 142, a right adjusting lever 144, and a footrest clasp catch 146. Left adjusting lever 142 and right adjusting lever 144 each may be spring-biased levers having pegs/pins that may fit within table housing 108 to secure tray 104 to table housing 108. Moving the levers one way against spring force may move the pegs from within table housing 108 and free tray 104 from table housing 108. In turn, the springs may move the levers in a second direction to move the pegs into table housing 108 and secure tray 104 to table housing 108. When attached to an upper surface of tray support bar 140, each may hinged to fold down in a direction of left lever arrow 148 and right lever arrow 150, respectively, to store tray 104 within table housing 108. In an alternate example, left adjusting lever 142 and right adjusting lever 144 may be attached to a lower surface of tray support bar 140.

Footrest 106 may be a platform to rest feet 28 of seated person 24. Footrest 106 generally may have a rectangular shape and include a footrest support surface 152 and a footrest front 154 and a footrest rear 156 positioned between a footrest left side 158 and a footrest right side 160. Footrest support surface 152 may be a flat upper boundary of footrest 106. Footrest left side 158 and footrest right side 160 may be hollow to receive a footrest left bracket 162 and a footrest right bracket 164, respectively.

Table housing 108 may be a protective cover to contain and support tables 102. Table housing 108 may be formed from generally hollow rectangular tubing to create a table housing interior 166. Table housing interior 166 may be a hollow area surrounded by a table housing top 168, a table housing bottom 170, a table housing left side 172, and a table housing right side 174.

Footrest left bracket 162 and footrest right bracket 164 each may be elongated L-shaped rods. A larger portion of these L-shaped rods may fit within the hollow space of footrest left side 158 and footrest right side 160, respectively, to support footrest 106. A smaller portion of these L-shaped rods may extend away from each other out of footrest rear 156 and into table housing left side 172 and table housing right side 174, respectively. Footrest left bracket 162 and footrest right bracket 164 may allow footrest 106 to horizontally slide relative to footrest left bracket 162 and footrest right bracket 164.

Figure 3:
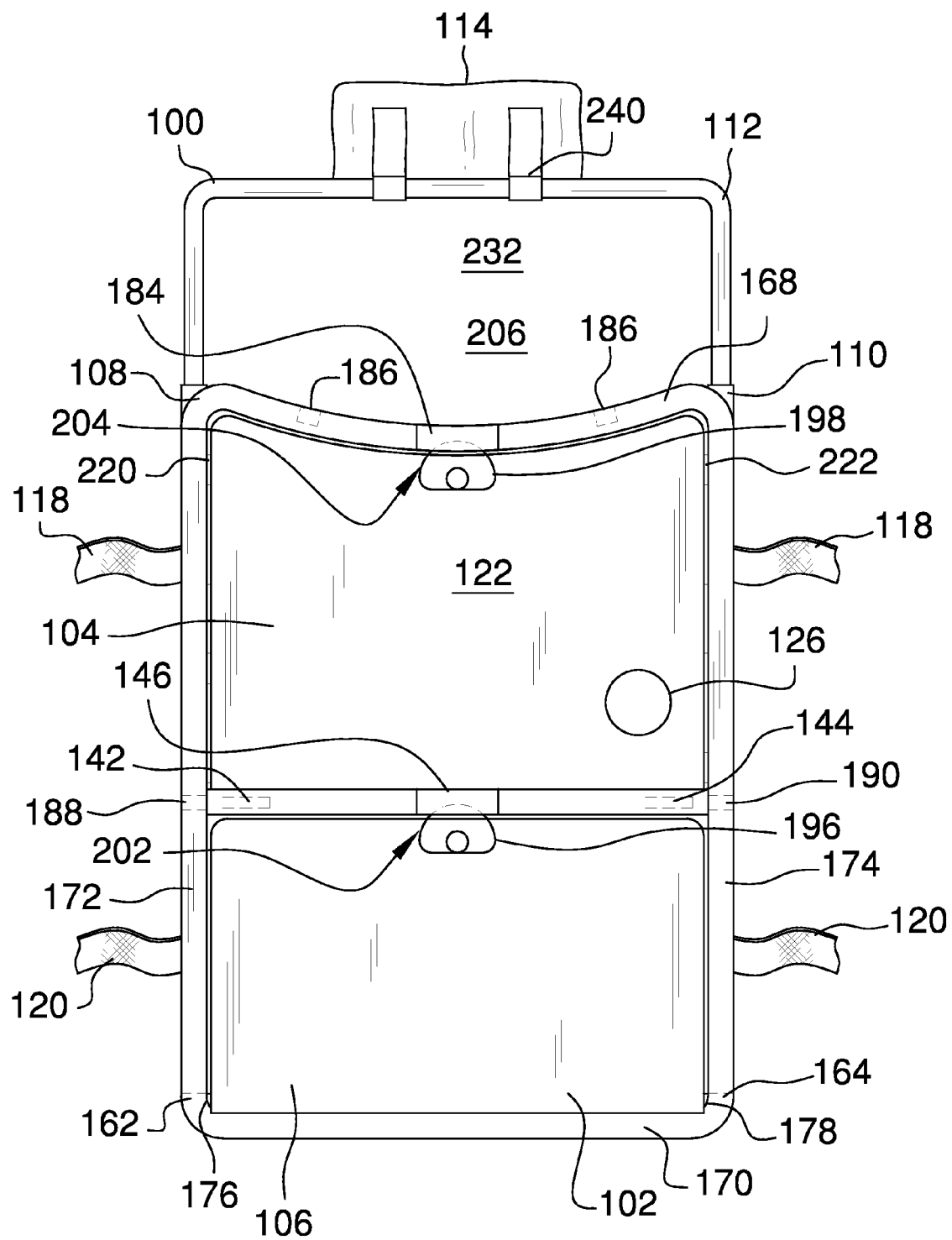
FIG. 3 is a front view of table assembly 100 with tables 102 secured in a stowed position.

FIG. 3 is a front view of table assembly 100 with tables 102 secured in a stowed position. Table housing left side 172 and table housing right side 174 may include a plurality of features to support tables 102. For example, table housing left side 172 may include a lower left bar hole 176 (FIG. 3) to receive footrest left bracket 162 and table right side 174 may include a lower right bar hole 178 (FIG. 3) to receive footrest right bracket 164.

Figure 4:
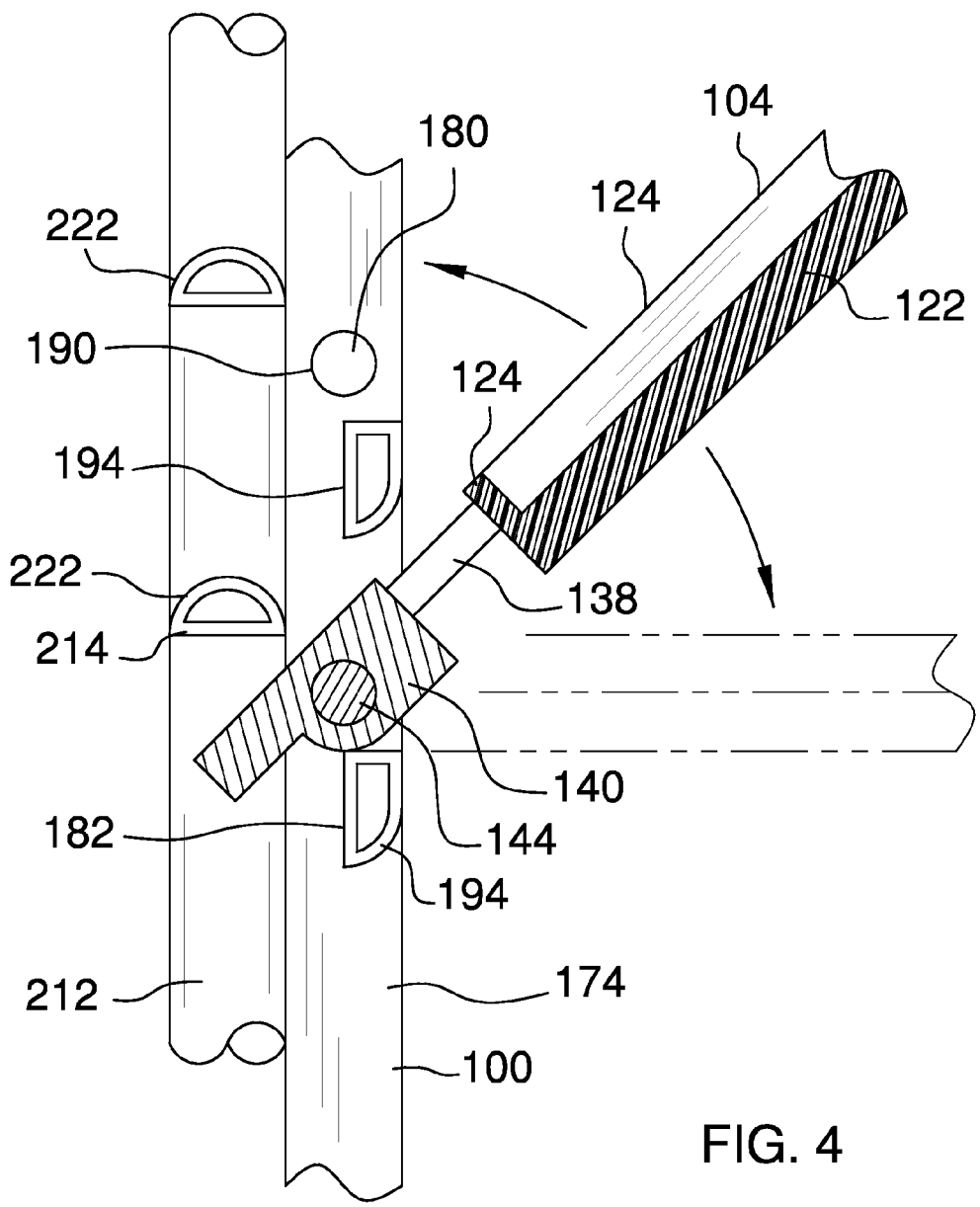
FIG. 4 is a section view of table assembly 100 generally taken off line 4-4 of FIG. 2.
Figure 5:
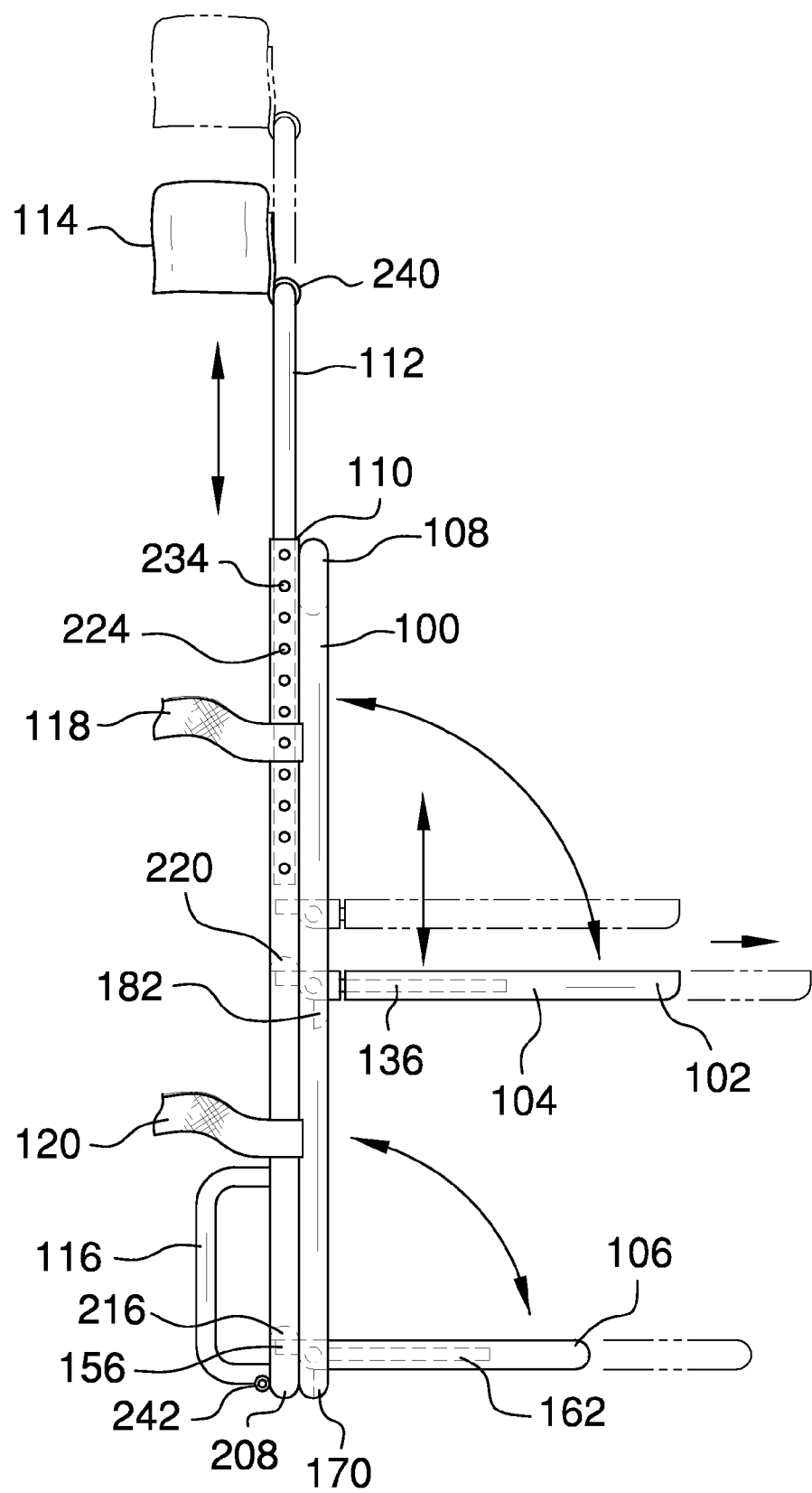
FIG. 5 is a side view of table assembly 100 with rotational, horizontal, and vertical movement for tables 102 shown by arrows.
Figure 6:
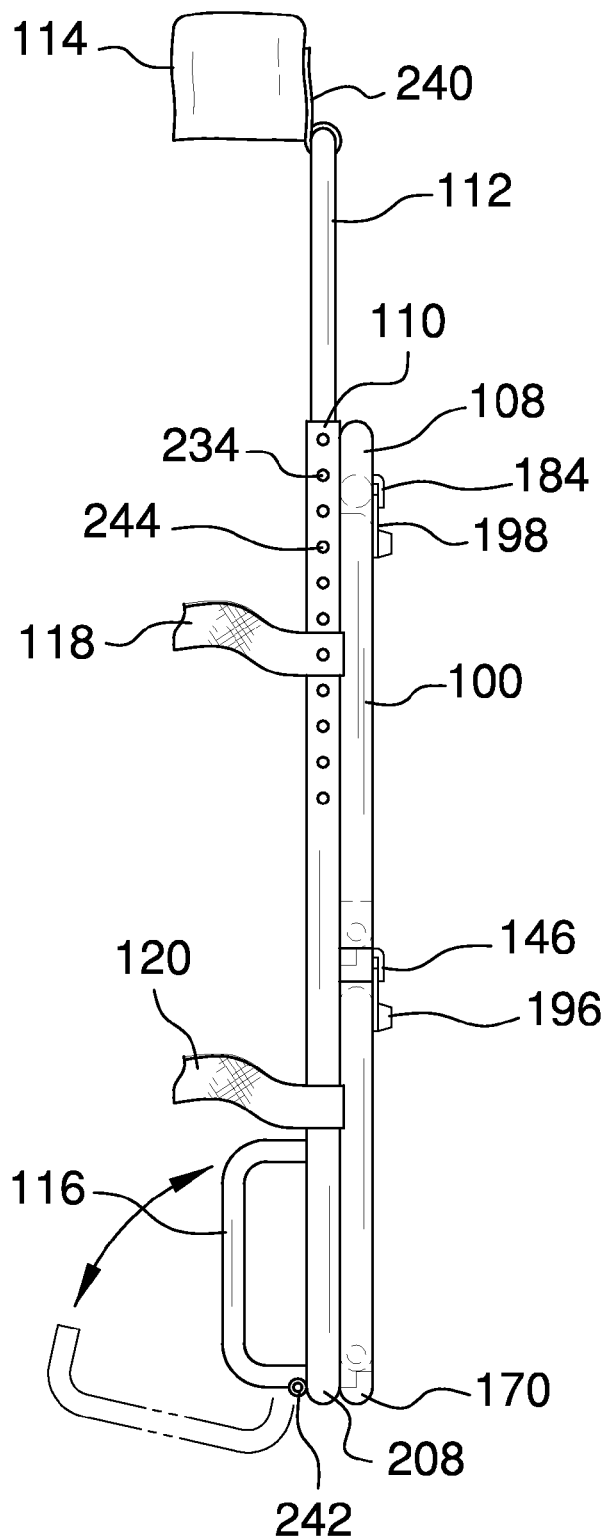
FIG. 6 is a side view of table assembly 100 with tables 102 in closed and secured positions and leveler bar 116 movement illustrated by an arrow.

FIG. 4 is a section view of table assembly 100 generally taken off line 4-4 of FIG. 2. FIG. 5 is a side view of table assembly 100 with rotational, horizontal, and vertical movement for tables 102 shown by arrows. FIG. 6 is a side view of table assembly 100 with tables 102 in closed and secured positions and leveler bar 116 movement illustrated by an arrow. In addition to lower left bar hole 176 (FIG. 3) and lower right bar hole 178 (FIG. 3), table assembly 100 may include a plurality of tray holes 180 (FIG. 4), a plurality of lower cross stop members 182, a tray clasp catch 184 (FIG. 2 and FIG. 3), and entertainment attachment holes 186 (FIG. 2). Plurality of tray holes 180 and plurality of lower cross stop members 182 may be interleaved with each other and positioned on table housing left side 172 and table housing right side 174 to face towards table housing interior 166 and to face each other. Tray clasp catch 184 and entertainment attachment holes 186 may be positioned adjacent to table housing top 168.

Plurality of tray holes 180 may be a series of vertically positioned openings through table housing 108 to receive pins of left adjusting lever 142 and right adjusting lever 144 and support tray 104. Plurality of tray holes 180 may include left tray holes 188 (FIG. 3) on table housing left side 172 and right tray holes 190 on table housing right side 174. Left tray holes 188 and right tray holes 190 may be aligned horizontally to face each other.

Plurality of lower cross stop members 182 (FIG. 4) may be a series of ribs vertically positioned to align tray 104 within table housing interior 166 when tray 104 is closed. In operation, tray support bar 140 may contact two lower cross stop members 182 when tray 104 is in a closed position. Lower cross stop members 182 may include left lower cross stop member 192 (hidden in view) on table housing left side 172 and right lower cross stop members 194 on table housing right side 174. Left lower cross stop members 192 and right lower cross stop members 194 may have similar shapes and may be aligned horizontally to face each other. In an example, each right lower cross stop member 194 may be positioned below a right tray hole 190 and be interperse alternately along table housing right side 174 with each right tray hole 190. Tray left bracket 136 and tray right bracket 138 may be connected between tray 104 and tray support bar 140 and tray 104 may have a width to provide a clearance between tray left bracket 136 and a tray right bracket 138 and plurality of lower cross stop members 182. When footrest 106 is closed, table housing bottom 170 may align footrest 106 within table housing interior 166.

In addition to footrest clasp catch 146 and tray clasp catch 184, table assembly 100 additionally may include a footrest clasp 196 (FIG. 3) and a tray clasp 198 (FIG. 3). Footrest clasp 196 may be semicircular, flat piece of material rotatably attached to footrest support surface 152 adjacent to footrest front 154. Tray clasp 198 may be semicircular, flat piece of material rotatably attached to tray support surface 122 adjacent to tray front 122.

Footrest clasp catch 146 may be a projection extending from tray support bar 140 to form a footrest clasp catch hollow area 202. With footrest 106 closed within table housing 108, footrest clasp catch 146 may be rotated to be located within footrest clasp catch hollow area 202 to secure footrest 106 to tray support bar 140. Footrest 106 may be unlocked from tray support bar 140 by rotating footrest clasp catch 146 out of footrest clasp catch hollow area 202.

Tray clasp catch 184 may be a projection extending from table housing top 168 to form a tray clasp catch hollow area 204. With tray 104 closed within table housing 108, tray clasp catch 184 may be rotated to be located within tray clasp catch hollow area 204 to secure tray 104 to table housing top 168. Tray 104 may be unlocked from table housing top 168 by rotating tray clasp catch 184 out of tray clasp catch hollow area 204.

An area enclosed by table housing top 168 and support frame 112 may define an entertainment area 206. Entertainment area 206 may be a region within table assembly 100 configured to receive additional devices, such as a radio, television, or electronic game device. Table housing top 168 may be curved downward towards tray support bar 140 to increase a size of entertainment area 206. Entertainment attachment holes 186 may be threaded openings into an upper surface of table housing top 168 to receive and secure entertainment devices. In one example, table assembly 100 may include a transitional member to connect additional entertainment devices to entertainment attachment holes 186. The additional entertainment devices may fit within entertainment area 206.

Adjusting frame 110 may be a framework to support table housing 108 and support frame 112 together. Adjusting frame 110 may include a hollow tube bent into a U-shape. Adjusting frame 110 may include an adjusting frame bottom 208 (FIG. 5) connected between an adjusting frame left side 210 (FIG. 2) and an adjusting frame right side 212 to define an adjusting frame interior 213. Adjusting frame interior 213 may be a hollow area between adjusting frame left side 210, adjusting frame right side 212, and adjusting frame bottom 208.

Adjusting frame 110 may include a plurality of upper cross stop members 214 (FIG. 4) configure to retain tables 102 at a horizontal position. For example, upper cross stop members 214 may include a left upper cross stop footrest member 216 (FIG. 5) attached to adjusting frame left side 210 and a right upper cross stop footrest member 218 (hidden in view) attached to adjusting frame right side 212 so that right upper cross stop footrest member 218 faces left upper cross stop footrest member 216. Footrest rear 156 may rotate upward to contact left upper cross stop footrest member 216 and right upper cross stop footrest member 218 to retain footrest 106 in a horizontal position.

Upper cross stop members 214 additionally may include left upper cross stop tray members 220 (FIG. 5) on adjusting frame left side 210 and right upper cross stop tray members 222 (FIG. 4) on adjusting frame right side 212. Left upper cross stop tray members 220 and right upper cross stop tray members 222 may be aligned horizontally to face each other. In an example, right upper cross stop tray members 222 (FIG. 4) may be positioned vertically between two adjacent right lower cross stop members 194. When tray 104 is rotated from table housing 108, left upper cross stop tray members 220 and its counterpart right upper cross stop tray members 222 may be positioned above tray support bar 140 to contact tray support bar 140 when tray 104 reaches a horizontal position.

Adjusting frame 110 may include a plurality of height adjustment holes 224 (FIG. 2). Height adjustment holes 224 may be openings through adjusting frame left side 210 and through adjusting frame right side 212. Plurality of height adjustment holes 224 may face away from adjusting frame interior 213 and may aid in adjusting the relative height between adjusting frame 110 and support frame 112 as discussed in more detail below.

Support frame 112 may be a framework to secure tables 102 to car 10 (FIG. 1). Support frame 112 may include a hollow tube bent into a U-shape having a support frame top 226 (FIG. 2) connected between a support frame left side 228 and a support frame right side 230 to define a support frame interior 232. Support frame interior 232 may be a hollow area between support frame left side 228, support frame right side 230, and support frame top 226.

Support frame 112 may include a left height adjustment button 234 attached to support frame left side 228 and a right height adjustment button 236 (hidden in view) attached to support frame right side 230. Support frame 112 may be inserted into adjusting frame 110. Left height adjustment button 234 and right height adjustment button 236 may be spring biased outward to engage height adjustment holes 224 and secure adjusting frame 110 and support frame 112 together.

Headrest fastener 114 may be a devise to attach support frame 112 to front headrest 22 (FIG. 1). In an example, headrest fastener 114 may be a flexible container with a single headrest opening 238 to fit over front headrest 22 and include headrest straps 240 to secure headrest fastener 114 to support frame top 226. In another example, headrest fastener 114 may be an adjustable strap having connecting buckle pieces to secure the strap around front headrest 22.

Leveler bar 116 may be a rigid prop that may reside between adjusting frame 110 and front seat back 20 (FIG. 1) to retain adjusting frame bottom 208 at an adjustable distance away from front seat back 20. In one example, leveler bar 116 may be a U-shaped tube. In another example, leveler bar 116 may be a fold-down adjustable wedge that may fold up when not in use. With upper buckle strap assembly 118 and lower buckle strap assembly 120 pulling adjusting frame bottom 208 towards front seat back 20 and leveler bar 116 pushing adjusting frame bottom 208 away from front seat back 20, an effect may be to stabilize a rotation of trays 102 and assist in retaining trays 102 in a horizontal position at all angles 32 (FIG. 1) of front seat back 20. Leveler bar 116 may be attached to adjusting frame 110 near adjusting frame bottom 208 by leveler bar hinges 242. Leveler bar hinges 242 may be jointed or flexible devices to allow the turning or pivoting of leveler bar 116. Leveler bar hinges 242 may be configured to lock in place and move out of a fixed position with at least two pounds of force. Leveler bar 116 may provide a straight up and down advantage.

Upper buckle strap assembly 118 and lower buckle strap assembly 120 each may include elongated strips of flexible material attached to a female buckle, a male tongue to fit in the female buckle, and an adjusting clip. Upper buckle strap assembly 118 and lower buckle strap assembly 120 each may be utilized to bind table housing 108 to front seat back 20.

Figure 7:
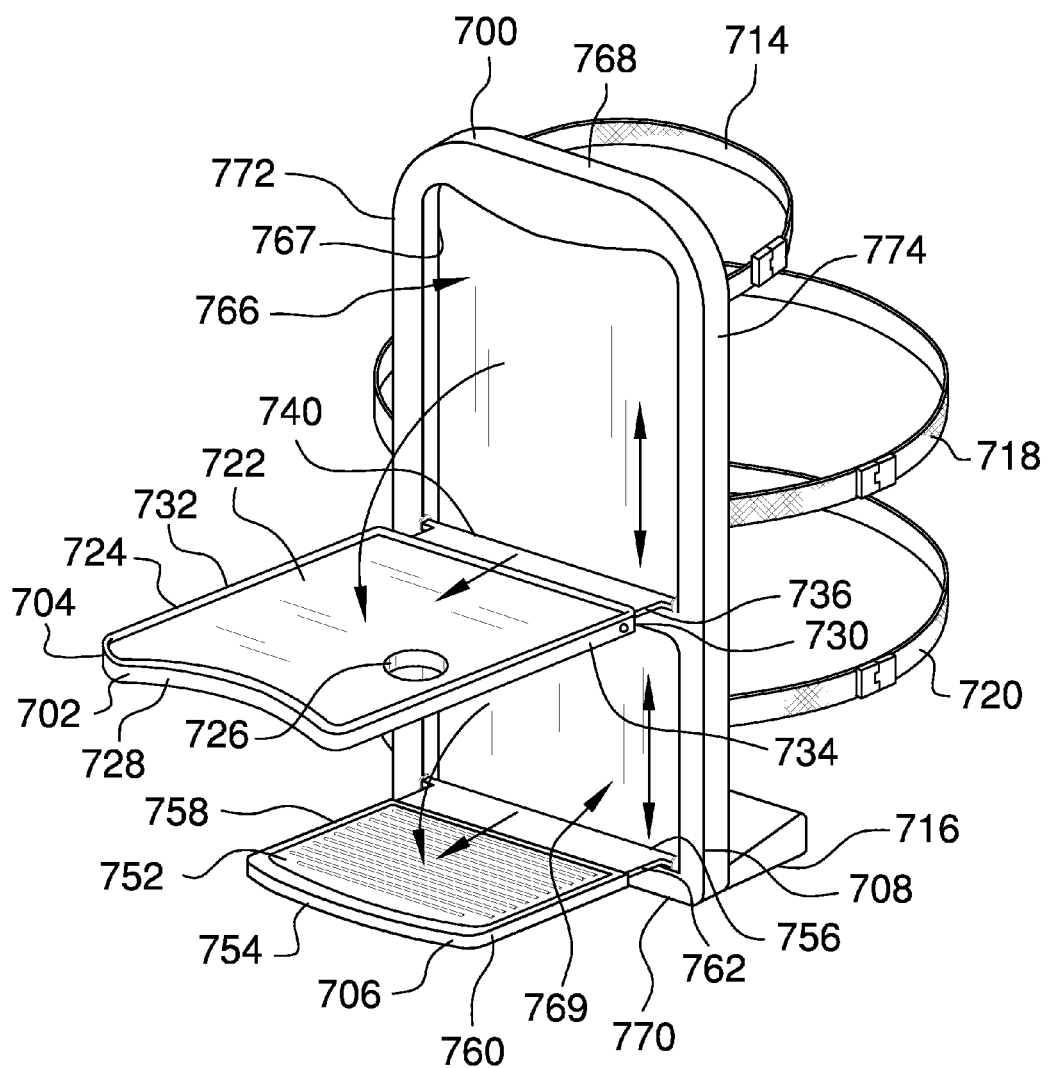
FIG. 7 is a side view of an automobile table assembly 700 for use in automobile 10.

FIG. 7 is a side view of an automobile table assembly 700 for use in automobile 10. Table assembly 700 may be a child's travel center having tables 702, such as a tray 704 and a footrest 706. Child 24 secured within child-restraint seat 18 may rest arm 26 on tray 702 and rest feet 28 on footrest 706 to support legs 30. Child 24 additionally may use tray 702 to support a drink cup, snacks, toys, books, and other items that may entertain child 24. Table assembly 700 may help to keep child 24 comfortable, happy, and occupied to allow a driver to concentrate on driving car 10 rather than the comforts of child 24.

As noted above, table assembly 700 may include tables 702, such as tray 704 and footrest 706. In addition, table assembly 700 may include a table housing 708, a headrest fastener 714, a leveler bar 716, an upper buckle strap assembly 718, and a lower buckle strap assembly 720. Both tray 704 and footrest 706 may be attached to table housing 708. In addition, headrest fastener 714, leveler bar 716, upper buckle strap assembly 718, and lower buckle strap assembly 720 each may be attached to table housing 708.

Headrest fastener 714 may be attached to front seat headrest 22 to secure table housing 708 vertically to automobile 10. Both tray 704 and footrest 706 may be rotated out of table housing 708 into a horizontal position.

Under some circumstances, front seat back 20 may not be vertical. Leveler bar 716 may be rotated relative to table housing 708 to pivot table assembly 700 relative to front seat back 20 and align tables 702 in a horizontal position. In one example, tables 702 may include a level tool having a floating bubble to help judge whether tables 702 are horizontal. Upper buckle strap assembly 718 and lower buckle strap assembly 720 may be secured around front seat back 20. Tray 704 may be moved up and downward relative to table housing 708 to be positioned at a comfortable height for arms 26 of child 24. In addition to being configured to move vertically, both tray 704 and footrest 708 may be move horizontally relative to table housing 708 to further refining the relative positioning of tables 702 to child 24.

Tray 704 may be an open receptacle to hold articles and food. Tray 704 may include a tray support surface 722 surrounded by a tray lip 724. Tray support surface 722 may be a flat plate that may include a cup holder 726 formed within tray support surface 722. Tray lip 724 may be a top edge of tray 704 extending upward and away from tray support surface 722. Cup holder 726 may be a device to hold a cup or other drinking container. In one example, cup holder 726 may be a recessed circular area formed within tray support surface 722.

Tray 704 may include a tray front 728 and a tray rear 730 positioned between a tray left side 732 and a tray right side 734. Tray front 728 may be concaved to curve inward into tray 704 and away from child 24. In addition, tray left side 732 and tray right side 734 may be hollow to receive a tray bracket 736.

Tray bracket 736 may be a flat sheet of rigid material configured to slide within tray 704 to movably support tray 704. Table assembly 700 additionally may include a tray support bar 740. Tray bracket 736 may be attached to tray support bar 740 and allow tray 704 to horizontally slide relative to tray bracket 736. Tray support bar 740 may be configured to be rotatably secure within table housing 708.

Footrest 706 may be a platform to rest feet 28 of seated person 24. Footrest 706 generally may have a rectangular shape and include a footrest support surface 752 and a footrest front 754 and a footrest rear 756 positioned between a footrest left side 758 and a footrest right side 760. Footrest support surface 752 may be a flat upper boundary of footrest 706. Footrest left side 758 and footrest right side 760 may be hollow to receive a footrest bracket 762.

Table housing 708 may be a protective cover to contain and support tables 702. Table housing 708 generally may be rectangular shape having a table housing interior 766 composed of a table housing tray interior 767 and a table housing footrest interior 769. Table housing interior 766 may be a hollow area surrounded by a table housing top 768, a table housing bottom 770, a table housing left side 772, and a table housing right side 774.

Footrest bracket 762 may be rigid sheet of material to fit within the hollow space of footrest left side 758, footrest right side 760, and footrest support surface 752 to moveably support footrest 706. A smaller portion of footrest bracket 762 may extend away out of footrest rear 756 and into table housing left side 772 and table housing right side 774. Footrest bracket 762 may allow footrest 706 to horizontally slide relative to footrest bracket 762.

Headrest fastener 714 may be a devise to attach table housing 708 to front headrest 22 (FIG. 1). In an example, headrest fastener 714 may be a flexible container with a single headrest opening to fit over front headrest 22 and include headrest straps to secure headrest fastener 714 to table housing 708. In another example, headrest fastener 714 may be an adjustable strap having connecting buckle pieces to secure the strap around front headrest 22.

Leveler bar 716 may be a rigid prop that may reside between table housing 708 and front seat back 20 (FIG. 1) to retain table housing bottom 770 at an adjustable distance away from front seat back 20. In one example, leveler bar 716 may be a U-shaped tube. In another example, leveler bar 716 may be a fold-down adjustable wedge. With upper buckle strap assembly 718 and lower buckle strap assembly 720 pulling table housing bottom 770 towards front seat back 20 and leveler bar 716 pushing table housing bottom 770 away from front seat back 20, an effect may be to stabilize a rotation of trays 702 and assist in retaining trays 702 in a horizontal position at all angles 32 (FIG. 1) of front seat back 20. Leveler bar 716 may be attached to table housing 708 near table housing bottom 770 by leveler bar hinges (hidden in view). The leveler bar hinges may be jointed or flexible devices to allow the turning or pivoting of leveler bar 716.

Upper buckle strap assembly 718 and lower buckle strap assembly 720 each may include elongated strips of flexible material attached to a female buckle, a male tongue to fit in the female buckle, and an adjusting clip. Upper buckle strap assembly 718 and lower buckle strap assembly 720 each may be utilized to bind table housing 708 to front seat back 20.

Figure 8:
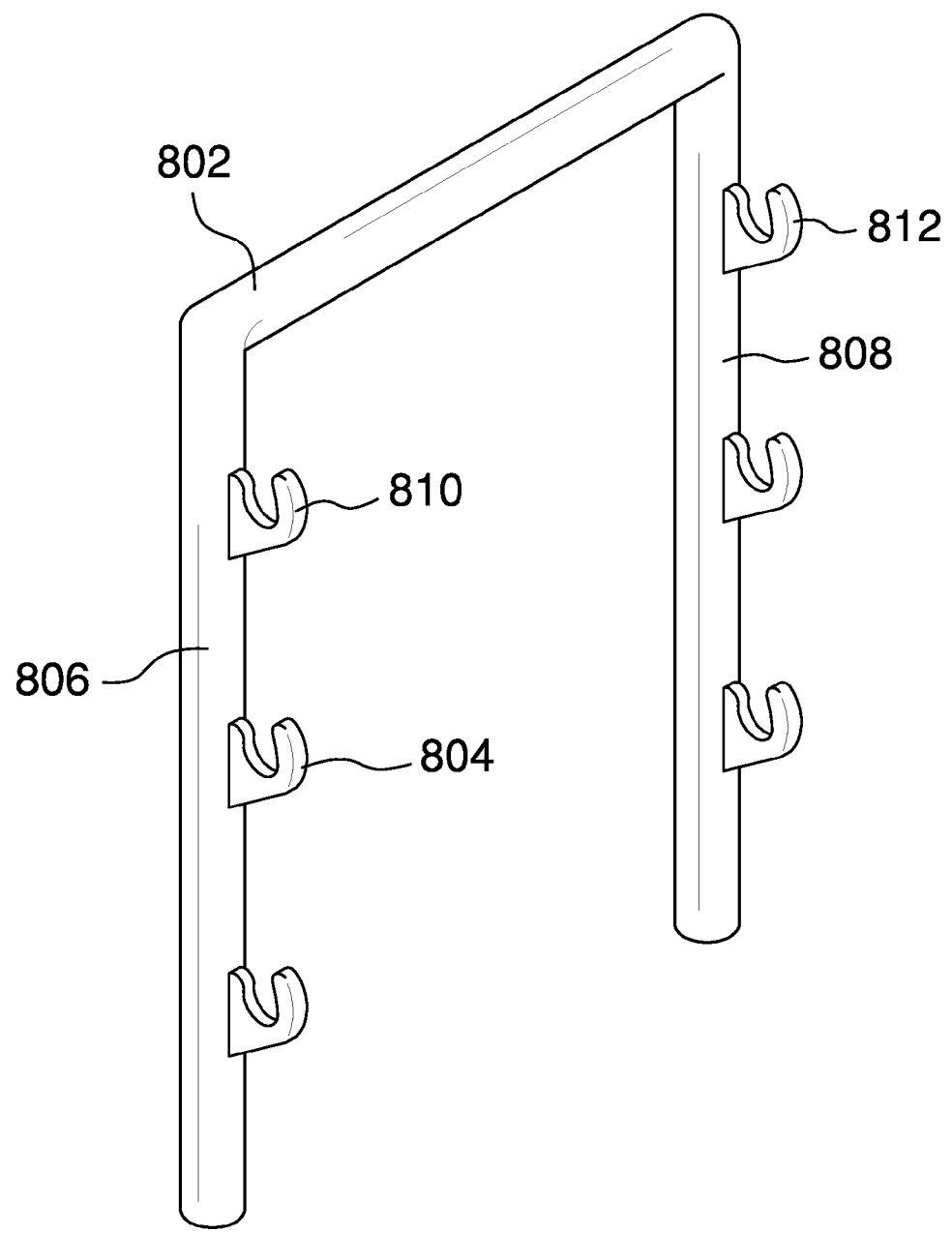
FIG. 8 is an isometric view of a support frame 802 having hooks 804.

FIG. 8 is an isometric view of a support frame 802 having hooks 804. Support frame 802 may function similarly to support frame 112. However, instead of push buttons 234, support frame 802 may utilize hooks 804 adjust the relative height of tables 102. Support frame 802 may include a support frame left side 806 and a support frame right side 808. Hooks 804 may include left hooks 810 attached along support frame left side 806 and right hooks 812 attached along support frame right side 808. Each pair of hooks 804 may be mechanical devices that may be curved upward to hold table housing 108 at particular position. Table housing 108 may include bars that extend from table housing 108 and into the curved portions of a pair of hooks 804. Table housing 108 may include multiple sets of bar that help prevent table housing 108 from swinging when at least four bars are inserted into hooks 804.

Figure 9:
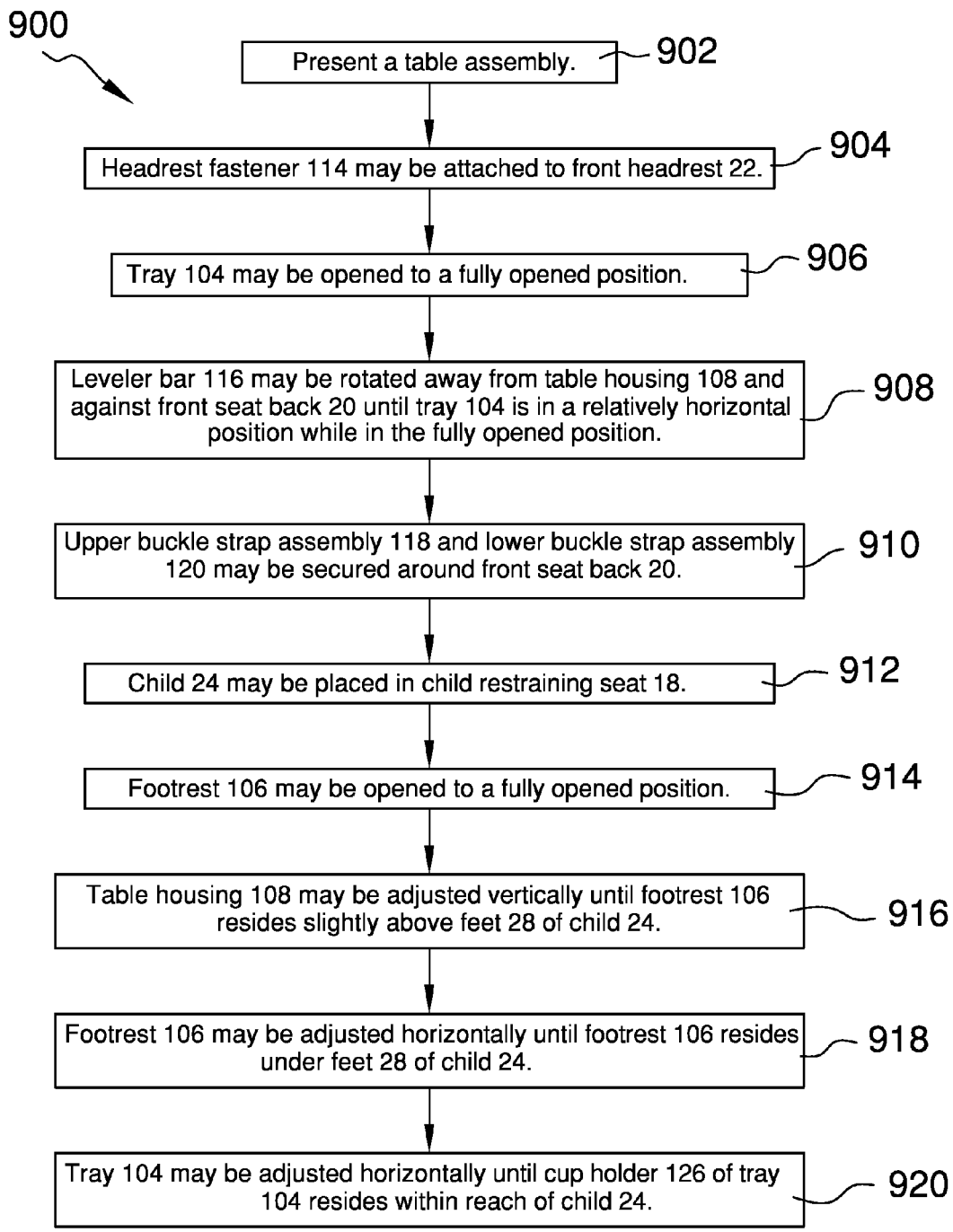
FIG. 9 is a method 900 to provide leg support for a person and to hold articles and food utilizing automobile table assembly 100.

FIG. 9 is a method 900 to provide leg support for a person and to hold articles and food utilizing automobile table assembly 100. At step 902, method 900 may present a table assembly. This may be table assembly 100 or table assembly 800. At step 904, headrest fastener 114 may be attached to front headrest 22. At step 906, tray 104 may be opened to a fully opened position. At step 908, leveler bar 116 may be rotated away from table housing 108 and against front seat back 20 until tray 104 is in a relatively horizontal position while in the fully opened position.

At step 910, upper buckle strap assembly 118 and lower buckle strap assembly 120 may be secured around front seat back 20. At step 912, child 24 may be placed in child restraining seat 18. At step 914, footrest 106 may be opened to a fully opened position.

At step 916, table housing 108 may be adjusted vertically until footrest 106 resides slightly above feet 28 of child 24. For example, table housing 108 may be adjusted until footrest 106 resides within one inch above feet 28 of child 24. At step 918, footrest 106 may be adjusted horizontally until footrest 106 resides under feet 28 of child 24. At step 920, tray 104 may be adjusted horizontally until cup holder 126 of tray 104 resides within reach of child 24.

The table assembly may be an accessory for use in a child-restraint seat such as a child's car seat or booster seat that may provide foot/leg support and may include a fold-down tray with a cup holder for snacks/drinks, toys, books, etc.

The table assembly may be made of a combination of materials, including metal, plastic, and cloth. The table assembly may measure approximately 2 feet 7 inches long and 14 inches wide. The table assembly may strap to the back of the car seat with adjustable buckles. The straps may include adjustable buckles to secure around the front seat. A 7-inch headrest strap or elastic cover at the top, as well as a fold-down adjustable leveler at the bottom, may help achieve stability and maintain vertical positioning. The front side of the table assembly (facing the child) may be cloth-covered for comfort. The top portion may fold down and slide out on brackets that may be height adjustable, creating a tray surface for snacks, toys, etc. The tray may have a cutout/hole for holding a cup.

The bottom portion of the table assembly may fold down and slide out on brackets to form a foot and leg rest. The bottom portion also may be height adjustable for an individualized fit. The table assembly may make long automobile trips more comfortable and entertaining for youngsters in car safety seats and booster seats. It may be easy to use and may make car trips more pleasant, not only for the child in the car seat, but for everyone else in the vehicle as well.

The table assembly may fulfill a need for an accessory for use with children's car seats or booster seats that may support the child's feet and legs while traveling and may include a foldout tray for toys, snacks, drinks, etc. Appealing features of the table assembly may include its ease of use, effective support, as well as an increased comfort and entertainment value it may provide to children in car seats and booster seats. The table assembly may provide a foldout support for a child to rest his or her feet and legs while riding. While infants and babies recline with leg support in their car seats, older babies and toddlers eventually grow enough so their legs extend well beyond the seat, yet they are too short to rest their feet on the floor of the vehicle comfortably as an adult may. Car rides have a tendency to make children sleepy, and if they remain safely buckled in their seats, their dangling feet can keep them from fully relaxing. Blood circulation to the legs may be compromised and they eventually become quite fatigued and uncomfortable, leading to the squirming and fussing that parents dread in the enclosed environment of the moving vehicle. The table assembly may provide comfortable foot/leg support for a child who may be old enough or big enough to experience the discomfort of dangling feet.

The table assembly also may provide a tray to place a snack, with a drink holder for a cup of juice, milk, or water. The tray may provide space to play with small toys, color with crayons, and do other activities. Restless children may be more apt to fuss or whine, or otherwise find ways to make a car trip unpleasant for other riders. The table assembly may help to keep children comfortable, happy, and occupied, and the parent could concentrate on driving the car.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A table assembly to provide leg support for a person and to hold articles and food in an automobile, the table assembly comprising:

a table housing;
a tray attached to the table housing, where the tray includes a hollow tray left side and a hollow tray right side, where a tray left bracket and tray right bracket are slideably positioned within the tray left side and the tray right side, respectively, where a tray support bar is connected between the tray left bracket and the tray right bracket at a position that is remote from the tray, where the tray support bar is both removeably and rotatable connected to the table housing within a table housing interior;
a footrest attached to the table housing, where the footrest is configured to be positioned to receive and support feet of the person; and
an adjusting frame attached to the table housing, where the adjusting frame is hollow;
a support frame moveably inserted into the adjusting frame;
a leveler bar attached to the adjusting frame;
an upper buckle strap assembly attached between the adjusting frame and the table housing;
a lower buckle strap assembly attached between the adjusting frame and the table housing below an upper surface of the leveler bar; and
a headrest fastener attached to the support frame,
where the table housing includes a plurality of tray holes interleaved with a plurality of lower cross stop members on both a table housing left side and a table housing right side, where each lower cross stop member includes an upper horizontal surface configured to contact a curved bottom surface of the tray support bar, where the adjusting frame includes a plurality of upper cross stop members on both a table housing left side and a table housing right side, where the upper cross stop members are interleaved between the plurality of lower cross stop members and each includes a lower horizontal surface configured to contact a flat top surface of the tray support bar.

2. The table assembly of claim 1, where the leveler bar is pivotally connected to the adjusting frame adjacent to an adjusting frame bottom of the adjusting frame by leveler bar hinges to be positioned outside of a surrounding horizontal perimeter of the footrest, where the leveler bar is configured to come into contact with a front seat back of an automobile front seat and to rotate away from and towards the tray and the footrest so that the support frame pivots at an upper surface against the front seat back.

3. The table assembly of claim 2, where the tray includes a tray front having a concave curve configured to face a child's restraint seat.

4. The table assembly of claim 2, further comprising:
a level tool having a floating bubble, where the level tool is attached to the tray.

5. The table assembly of claim 4, further comprising:
means for fixing the adjusting frame to the support frame.

6. The table assembly of claim 5, where the means for fixing includes a ball and detent, where the adjusting frame includes a plurality of height adjustment holes positioned to face away from an adjusting frame interior of the adjusting frame and the support frame includes a left height adjustment button extending through a first height adjustment hole and includes a right height adjustment button extending through a second height adjustment hole.

7. In an automobile, a method to provide leg support for a person and to hold articles and food utilizing a table assembly, the method comprising:
presenting the table assembly, where the table assembly includes a table housing, a tray attached to the table housing, where the tray includes a hollow tray left side and a hollow tray right side, where a tray left bracket and tray right bracket are slideably positioned within the tray left side and the tray right side, respectively, where a tray support bar is connected between the tray left bracket and the tray right bracket at a position that is remote from the tray, where the tray support bar is both removeably and rotatable connected to the table housing within a table housing interior, a footrest attached to the table housing, where the footrest is configured to be positioned to receive and support feet of the person, and an adjusting frame attached to the table housing, where the adjusting frame is hollow, a support frame moveably inserted into the adjusting frame, a leveler bar attached to the adjusting frame, an upper buckle strap assembly attached between the adjusting frame and the table housing, a lower buckle strap assembly attached between the adjusting frame and the table housing below an upper surface of the leveler bar, and a headrest fastener attached to the support frame, where the table housing includes a plurality of tray holes interleaved with a plurality of lower cross stop members on both a table housing left side and a table housing right side, where each lower cross stop member includes an upper horizontal surface configured to contact a curved bottom surface of the tray support bar, where the adjusting frame includes a plurality of upper cross stop members on both a table housing left side and a table housing right side, where the upper cross stop members are interleaved between the plurality of lower cross stop members and each includes a lower horizontal surface configured to contact a flat top surface of the tray support bar;

attaching the headrest fastener to a headrest in the automobile;

opening the tray to a fully open position; and rotating the leveler bar away from the table housing to contact a seat back of a seat in the automobile until the tray is in a relatively horizontal position.

8. The method of claim 7, where the leveler bar is pivotally connected to the adjusting frame adjacent to an adjusting frame bottom of the adjusting frame by leveler bar hinges to be positioned outside of a surrounding horizontal perimeter of the footrest, where the leveler bar is configured to come into contact with a front seat back of an automobile front seat and to rotate away from and towards the tray and the footrest so that the support frame pivots at an upper surface against the front seat back, the method further comprising:

securing to the seat back an upper buckle strap assembly attached to the table housing and a lower buckle strap assembly attached to the table housing.

9. The method of claim 7, where the tray support bar includes a left adjusting lever and a right adjusting lever, each pivoted to rotate between a horizontal and vertical position, where the tray includes a cup holder, where the footrest includes a footrest left side and a footrest right side, and where the footrest left side and the footrest right side are hollow and slideably include a footrest left bracket and footrest right bracket, respectively, the method further comprising:

vertically adjusting the table housing until the footrest resides above feet of a child sitting in a child restraining seat facing the table assembly.

10. The method of claim 9, where the table housing top is concave to curve downward, where the table assembly includes a tray clasp catch positioned between entertainment attachment holes adjacent to a table housing top, where an area enclosed by a table housing top and the support frame defines a hollow entertainment area configured to encircle a radio attached to the entertainment holes, and where the head rest fastener is a flexible container enclosed on five sides and open at one end with a headrest opening, the method further comprising:

horizontally adjusting the tray until a cup holder with the tray resides within a reach of the child.

11. The table assembly of claim 2, where the tray support bar includes a left adjusting lever and a right adjusting lever, each pivoted to rotate between a horizontal and vertical position, where the tray includes a cup holder, where the footrest includes a footrest left side and a footrest right side, and where the footrest left side and the footrest right side are hollow and slideably include a footrest left bracket and footrest right bracket, respectively.

12. The table assembly of claim 11, where the table housing top is concave to curve downward, where the table assembly includes a tray clasp catch positioned between entertainment attachment holes adjacent to a table housing top, where an area enclosed by a table housing top and the support frame defines a hollow entertainment area configured to encircle a radio attached to the entertainment holes, and where the head rest fastener is a flexible container enclosed on five sides and open at one end with a headrest opening.

\* \* \* \* \*